United States Patent [19]

Wingler et al.

[11] Patent Number: 4,631,311

[45] Date of Patent: Dec. 23, 1986

[54] ACRYLONITRILE FREE BLENDS OF A POLYCARBONATE, A GRAFT RUBBER AND A TERPOLYMER RESIN

[75] Inventors: Frank Wingler, Leverkusen; Otto Koch; Christian Lindner, both of Cologne; Klaus Reinking, Wermelskirchen, all of Fed. Rep. of Germany

[73] Assignee: Bayer Aktiengesellschaft, Leverkusen, Fed. Rep. of Germany

[21] Appl. No.: 763,684

[22] Filed: Aug. 8, 1985

[30] Foreign Application Priority Data

Aug. 21, 1984 [DE] Fed. Rep. of Germany ....... 3430689

[51] Int. Cl.$^4$ .............................................. C08L 69/00
[52] U.S. Cl. ..................................... 525/67; 525/146; 525/148
[58] Field of Search .................. 525/67, 146, 148, 68, 525/468, 902

[56] References Cited

U.S. PATENT DOCUMENTS

| | | | |
|---|---|---|---|
| 3,880,783 | 4/1975 | Serini et al. | 525/67 X |
| 4,197,376 | 4/1980 | Lee et al. | 525/74 |
| 4,218,544 | 8/1980 | Henton | 525/67 |
| 4,351,920 | 9/1982 | Ariga et al. | 525/67 |
| 4,404,322 | 9/1983 | Saito et al. | 525/74 |

FOREIGN PATENT DOCUMENTS 0135492 8/1984 European Pat. Off.

*Primary Examiner*—Theodore E. Pertilla
*Attorney, Agent, or Firm*—Connolly and Hutz

[57] ABSTRACT

This invention relates to thermoplastic moulding compounds free from nitrile groups, containing a mixture of randomly structured copolymers containing methyl methacrylate, maleic acid anhydride and aromatic vinyl compounds, aromatic polycarbonate resins and an elastomer grafted with methyl methacrylate.

1 Claim, No Drawings

ACRYLONITRILE FREE BLENDS OF A POLYCARBONATE, A GRAFT RUBBER AND A TERPOLYMER RESIN

This invention relates to thermoplastic moulding compounds which are free from nitrile groups and contain a mixture of randomly structured copolymers containing methyl methacrylate, maleic acid anhydride and aromatic vinyl compounds, aromatic polycarbonate resins and an elastomer grafted with methyl methacrylate.

Polymer mixtures based on styrene/maleic acid anhydride/acrylonitrile copolymers, polycarbonate resins and rubber graft polymers containing acrylonitrile groups are described in DE-OS No. 2,653,146 and DE-OS No. 2,653,143. DE-OS No. 3,130,774 discloses mixtures containing styrene/maleic acid anhydride or styrene/maleic acid anhydride/acrylonitrile resins, polycarbonate resins and graft products of styrene or of styrene and acrylonitrile on a rubber (see also U.S. Pat. Nos. 4,404,322 and 4,197,376.).

It has been found, however, that such polymer mixtures containing acrylonitrile readily discolour in the course of processing and tend to undergo cross linking, especially when used in combination with maleic acid anhydride copolymers. Furthermore, graft products containing mainly styrene or also acrylonitrile are not compatible with the maleic acid anhydride resin component, with the result that delamination occurs under mechanical stress. It has therefore been attempted to graft rubbers with anhydride polymers and to mix these graft products with a polycarbonate resin, another anhydride copolymer of a monovinylidene aromatic monomer and an $\alpha,\beta$-ethylenically unsaturated anhydride as well as with a compatible polymer of a monomer other than the anhydride (U.S. Pat. No. 4,218,544). Other rubber-modified styrene/maleic acid anhydride copolymers prepared by the polymerisation of styrene and maleic acid anhydride in the presence of a rubber in admixture with a polycarbonate resin as the main component are mentioned in EP-A Pat. No. 63 634 and U.S. Pat. No. 4,351,920. Such mixtures are also subject to delamination; moreover, due to the tendency to alternating 1:1 copolymerisation with aromatic vinyl monomers, the random incorporation of maleic acid anhydride in graft products can be achieved only if special inflow and after dosing methods are observed, but these methods are not accurately reproducible (see also U.S. Pat. No. 3,919,854).

According to the present invention there is provided to "thermoplastic moulding compounds" of
  (A) 12-78 parts by weight (based on the moulding compound) of a randomly structured copolymer of
    ($a_1$) 24 to 87 parts by weight (based on the copolymer) of styrene, p-methyl styrene or mixtures thereof,
    ($a_2$) 8 to 30 parts by weight (based on the copolymer) of maleic acid anhydride and
    ($a_3$) 5 to 68 parts by weight (based on the copolymer) of methyl methacrylate,
  (B) 12-78 parts by weight (based on the moulding compound) of a thermoplastic dihydroxy-diaryl alkane (polycarbonate) and
  (C) 10-40 parts by weight (based on the moulding compound) of a graft polymer of 20-80 parts by weight of methyl methacrylate on 80-20 parts by weight of a rubber having a glass transition temperature below $-20°$ C.

The resin (A) is a chemically uniform random copolymer of aromatic vinyl compounds, methyl methacrylate and maleic acid anhydride. Such copolymers may advantageously be prepared by solvent free or solution polymerisation with Incomplete conversion rates in a vigorously mixing, continuously charged reactor, for example as described in DE-AS No. 2,724,360. The total maleic acid anhydride content is 8–30% by weight.

Aromatic vinyl compounds for the purpose of this invention are styrene and p-methyl styrene.

The preferred resins (A) are composed of 24 to 87 parts by weight of styrene and/or p-methyl styrene, 5 to 46 parts by weight of methyl methacrylate and 8 to 30 parts by weight of maleic acid anhydride.

"Nitrile group-free" means that the nitrile group content is below 1.8% by weight, based on the multipolymer (A).

The aromatic polycarbonates used as component (B) in the present invention for preparing the polymer blend are homopolycarbonates and copolycarbonates based, for example, on one or more of the following diphenols:
Hydroquinone,
resorcinol,
dihydroxy biphenyls,
bis-(hydroxyphenyl)-alkanes,
bis-(hydroxyphenyl)-cycloalkanes,
bis-(hydroxyphenyl)-sulphides,
bis-(hydroxyphenyl)-ethers,
bis-(hydroxyphenyl)-ketones,
bis-(hydroxyphenyl)-sulphoxides,
bis-(hydroxyphenyl)-sulphones and
$\alpha,\alpha'$-bis-(hydroxyphenyl)-diisopropyl benzenes,
and corresponding compounds which are alkylated or halogenated in the nucleus. These and other suitable diphenols are described, for example, in U.S. Pat. Nos. 3,028,365; 2,999,835; 3,148,172; 3,275,601; 2,991,273; 3,271,367; 3,062,781 and 2,999,846, in German Offenlegungsschriften Nos. 1,570,703; 2,063,050; 2,063,052; 2,211,956 and 2,211,957; French Pat. No. 1,561,518 and the monograph "H. Schnell, Chemistry and Physics of polycarbonates, Interscience Publishers, New York, 1964". The following are examples of preferred diphenols:
4,4'-dihydroxybiphenyl;
2,2-bis-(4-hydroxyphenyl)-propane;
2,4-bis-(4-hydroxyphenyl)-2-methyl butane;
1,1-bis-(4-hydroxyphenyl)-cyclohexane;
$\alpha,\alpha'$-bis-(4-hydroxyphenyl)-p-diisopropyl benzene;
2,2-bis-(3-methyl-4-hydroxyphenyl)-propane;
2,2-bis-(3-chloro-4-hydroxyphenyl)-propane;
bis-(3,5-dimethyl-4-hydroxyphenyl)-methane;
2,2-bis-(3,5-dimethyl-4-hydroxyphenyl)-propane;
bis-(3,5-dimethyl-4-hydroxyphenyl)-sulphone;
2,4-bis-(3,5-dimethyl-4-hydroxyphenyl)-2-methyl butane;
1,1-bis-(3,5-dimethyl-4-hydroxyphenyl)-cyclohexane;
$\alpha,\alpha$-bis-(3,5-dimethyl-4-hydroxyphenyl)-p-diisopropyl benzene;
2,2-bis-(3,5-dichloro-4-hydroxyphenyl)-propane; and
2,2-bis-(3,5-dibromo-4-hydroxyphenyl)-propane.

The following are examples of particularly preferred diphenols:
2,2-bis-(4-hydroxyphenyl)-propane;
2,2-bis-(3,5-dimethyl-4-hydroxyphenyl)-propane;
2,2-bis-(3,5-dichloro-4-hydroxyphenyl)-propane;

2,2-bis-(3,5-dibromo-4-hydroxyphenyl)-propane;
1,1-bis-(4-hydroxyphenyl)-cyclohexane.

Preferred aromatic polycarbonates are those based on one or more of the preferred diphenols. Particularly preferred are those copolycarbonates which are based on 2,2-bis-(4-hydroxyphenyl)-propane and one of the other diphenols mentioned as particularly preferred. Polycarbonates based solely on 2,2-bis-(4-hydroxyphenyl)-propane or 2,2-bis(3,5-dimethyl-4-hydroxyphenyl)-propane are also particularly preferred.

The aromatic polycarbonates may be prepared by known processes, e.g. by solvent free ester interchange from bisphenol and diphenyl carbonate or in solution from bisphenols and phosgene. The solution may be homogeneous ("pyridine process") or heterogeneous ("diphasic interface process"). Polycarbonates which have been prepared in solution, in particular by the diphasic interface process, are particularly suitable for the purpose of the invention.

The aromatic polycarbonates may be branched by the incorporation of small quantities, preferably from 0.05 to 2.0 mol percent, based on the quantity of diphenols, of trifunctional or higher functional compounds, e.g. compounds having 3 or more than 3 phenolic hydroxyl groups.

Polycarbonates of this kind are described, for example, in DE-OS Nos. 1,570,533; 1,595,762; 2,116,974; 2,113,347; 2,500,092; GB-PS No. 1,079,821 and U.S. Pat. No. 3,544,514.

The following are some examples of suitable compounds having three or more phenolic hydroxyl groups; phloroglucinol; 4,6-dimethyl-2,4,6-tri-(4-hydroxy phenyl)heptene-2; 4,6-dimethyl-2,4,6-tri-(4-hydroxy phenyl)heptane; 1,3,5-tri-(4-hydroxy phenyl)-benzene; 1,1,1-tri(4-hydroxy phenyl)-ethane; tri-(4-hydroxy phenyl)-cyclohexyl-propane; 2,4-bis-(4-hydroxy phenyl isopropyl)-phenol; 2,6-bis-(2'-hydroxy-5'-methyl benzyl)-4-methyl phenol; 2-(4-hydroxy phenyl)-2-(2,4-dihydroxy phenyl)-propane and 1,4-bis-(4,4''-dihydroxy triphenyl-methyl)-benzene. Other trifunctional compounds are: 2,4-dihydroxy benzoic acid, trimesic acid, cyanuric chloride and 3,3-bis-(4-hydroxy phenyl)-2-oxo-2,3-dihydro-indole.

The aromatic polycarbonates should generally have an average molecular weight (weight average $M_w$) of from 10,000 to over 200,000, preferably from 20,000 to 80,000 (determined by measurements of the relative viscosity in $CH_2Cl_2$ at 25° C. at a concentration of 0.5% by weight.).

In the case of polycarbonate mixtures, high molecular weight polycarbonates having molecular weights $M_w$ of from 10,000 to 200,000 may also contain an admixture of small quantities of low molecular weight polycarbonates, e.g. with an average degree of polymerisation of 2 to 20.

The graft polymers (C) are composed of 80 to 20 parts by weight of a rubber and 20 to 80 parts by weight of predominantly methyl methacrylate which has been polymerised in the presence of the rubber.

These graft polymers are known and may be prepared by graft polymerising the methyl methacrylate in the presence of a rubber by known polymerisation processes such as solvent free, solution, emulsion, dispersion or suspension polymerisation or by a combined process, e.g. solution-suspension polymerisation. When polymerisation of methyl methacrylate is carried out, ungrafted polymethyl methacrylate is formed in addition to graft polymers of the vinyl monomer on the rubber component. The quantity of this ungrafted constituent may be varied within a wide range by adjusting the graft polymerisation process and the polymerisation conditions. The degree of grafting is normally taken as a measure of the quantity of the graft polymerised methyl methacrylate. Graft polymers (C) for the purpose of this invention are polymers which have been formed by polymerisation of the vinyl monomer in the presence of the rubber, regardless of the degree of grafting.

The rubbers used for graft polymerisation may be uncross linked, partly cross linked or highly cross linked. When graft polymerisation is carried out in solution, for example, then uncross linked rubbers are used as starting material whereas emulsion grafting may be carried out with virtually any rubbers, whether cross linked or not, provided they are present in the form of an emulsion. The graft polymers (C), however, invariably contain at least partially cross linked rubbers, preferably rubbers having a degree of cross linking of at least 50% by weight. This means that even when uncross linked rubbers are used as starting material for the graft polymers (C), at least a partial after cross linking of the rubber component must take place during the actual graft polymerisation of methyl methacrylate on rubber.

Graft polymers (C) which are suitable for the purpose of this invention are therefore polymers which are at least partially cross linked. The graft polymers normally have a gel content (i.e. insoluble component as measure for the degree of cross linking) of at least 15% by weight, preferably at least 50% by weight, more particularly at least 60% by weight, determined at 23° C. in organic solvents.

Graft polymerisation of the methyl methacrylate, optionally as a mixture with small quantities of comonomer, is preferably initiated by radical or thermal initiation.

Natural and synthetic rubbers in a soluble or uncross linked form are used as graft basis (C 1). Suitable synthetic rubbers include homo and copolymers of optionally halogen-substituted, conjugated dienes having 4 to 8 carbon atoms, such as butadiene, isoprene, chloroprene and their copolymers with styrene and/or acrylonitrile. The copolymers may be randomly structured or in block form. Block products may consists, for example, of two-block polymers of the form AB or three-block polymers of the form ABA or stellate block polymers, say of the form $(ABA)_xY$, where A may represent, for example, Styrene, B may represent butadiene and Y may represent a polyfunctional coupling reagent such as $SiCl_4$, $S_2Cl_2$, divinyl benzene, epoxidised fatty acid, etc., and x has a value of the order of 2 to 5. When soluble rubber is used, the polybutadienes preferably have a high cis double bond content in the polymer chain, amounting to over 55%, and the proportion of 1,2-vinyl double bonds may be up to 15%, based on all the double bonds; both linear and stellate styrene-butadiene block polymers having a styrene content of from 5 to 45% by weight may advantageously be used.

Another class of synthetic rubbers consists of ethylene-propylene co- and terpolymers. They contain 70 to 30 parts by weight of ethylene for 30 to 70 parts by weight of propylene. Terpolymers containing from 4 to 15% by weight of, for example, 5-ethylidene-norbornene, dicyclopentadiene, hexadiene-(1,4) or 2,2,1-bicycloheptadiene with about 1 to 20 C═C double bonds per 1000 atoms are advantageously used. Graft components based on these so called EPDM or APTK rubbers are distinguished by their exceptionally good weather resistance. The class of polyethylene-co-vinyl acetates (EVA) and acrylate elastomers are also weather resistant graft components. The EVA elastomers contain from 30 to 85% of vinyl acetate incorporated by polymerisation and may be esterified in side chains with unsaturated carboxylic acids such as acrylic or methacrylic acid to facilitate their grafting reaction. The EVA copolymers may also be partially saponified, with OH numbers of from 1 to about 100 mg of KOH per g of substance. The acrylate rubbers are in most cases copolymers of $C_2-C_8$ alkyl esters of acrylic acid, e.g. ethyl, n- or isopropyl, n-butyl, iso-butyl, tertiary butyl or 2-ethylhexyl acrylate. Other comonomers include inter alia methacrylates having 1 to 14 carbon atoms in the ester moiety, butadiene, and vinyl alkyl ethers having 1 to 18 carbon atoms in the ether moiety. These acrylate rubbers may contain small quantities of polyfunctional vinyl or allyl monomers for cross linking the acrylate rubber. The following are examples of such functional monomers: alkylene glycol di(meth)acrylates, (meth)acrylic acid vinyl esters, triallyl cyanurate, butadiene, isoprene, divinyl benzene, etc.

The graft component (C) may be built up of several shells, e.g. of a polybutadiene, polystyrene, polymethyl methacrylate or SAN polymer core enveloped in a polyacrylic acid ester. Preferred among the graft substrates are those based on polybutadiene and polyacrylic acid esters such as those described in some detail, for example, in DE-OS Nos. 3,039,114; 3,039,115; 3,117,052 and 3,210,284, EP No. 0,063,263 and EP No. 0,064,692.

Components (A), (B) and (C) are prepared separately and mixed by solvent free compounding on rollers, kneaders, internal mixers or screw machines, using the conventional mixing techniques for polymer blends. Conventional additives such as lubricants, stabilizers, flame retarding agents, pigments, reinforcing fillers, mineral fillers, matting agents, etc. may be included. The polymer blend moulding compounds may be used for producing all kinds of moulded products. They are distinguished in particular by their good flow characteristics for injection moulding or extrusion and their high dimensional stability under heat and mechanical strength and the high strength of their coalescence seams. The moulded bodies are particularly distinguished by their freedom from scaling or delamination when subjected to mechanical stress. The polymer blends claimed according to the invention have an excellent light shade in the raw state and can be processed without discolouration at high temperatures of from 240° C. to over 300° C. in short operating cycles with high utilisation of the machines.

The invention will now be described in more detail with the aid of the following examples but is not restricted to these. The parts given in the examples are parts by weight and the percentages are percentages by weight unless otherwise indicated.

Preparation of the copolymer resins (A)

750 parts of a mixture having a composition as indicated in Table 1 are introduced into a double walled vessel equipped with internal thermometer, stirrer, inlet and outlet, and heated to 130° C. A stream of monomers having the same composition is then added and the same quantity of polymer solution is at the same time removed from the vessel to keep the level of filling of the vessel constant. About 0.05 parts of tertiary butyl perpivalate (75% in dibutyl phthalate) per hour is continuously added to the monomer stream. The conversion rate settles to a constant value of about 40% after about 2 hours. 0.1% by weight of 2,6-di-t-butyl-p-cresol is added to the polymer solution, which is then freed from monomers and volatile constituents in an evaporation extruder.

TABLE 1

| | Composition of starting monomers and copolymers A | | | | | | | | | |
|---|---|---|---|---|---|---|---|---|---|---|
| | Starting monomers | | | | | Copolymer | | | | |
| | Sty | MA | MMA | NPMI | ACN | Sty | MA | MMA | NPMI | ACN |
| A1 | 58.0 | 4.5 | 37.5 | — | — | 59.0 | 10.0 | 31.0 | — | — |
| A2 | 59.5 | 1.3 | 36.0 | 3.2 | — | 59.8 | 3.0 | 30.2 | 7.0 | — |
| A3 | 59.0 | 6.0 | 35.0 | — | — | 60.2 | 13.9 | 25.9 | — | — |
| Comparison Examples | | | | | | | | | | |
| V1 | 73.0 | 5.0 | — | — | 26.0 | 71.0 | 12.0 | — | — | 17.0 |
| V2 | 70.5 | 3.5 | — | — | 26.0 | 68.8 | 8.1 | — | — | 23.1 |

Sty: Styrene
MA: Maleic acid anhydride
MMA: methyl methacrylate
NPMI: N—phenyl-maleimide
ACN: acrylonitrile Polycarbonate resin B The polycarbonate based on 4,4-dihydroxy-diphenyl propane-(2,2) (BPA polycarbonate) had a relative viscosity of 1.28 determined on a solution of 0.5 g of polycarbonate in 100 ml of methylene chloride at 25° C.

Graft copolymers (C)

$C_1$ graft rubber, prepared by grafting 20 parts of methyl methacrylate on 80 parts of an emulsion polymerised polybutadiene, in which the average particle diameter of the graft basis is about 0.4 μm.

$C_2$ graft rubber, prepared by grafting 30 parts of methyl methacrylate on 70 parts of an emulsion polymerised cross linked butyl acrylate rubber, in which the average particle diameter of the graft basis is 0.5 μm.

$C_3$ graft rubber, prepared by grafting 50 parts of styrene and acrylonitrile in proportions of 72:28 on 50 parts of an emulsion polymerised polybutadiene, in which the average particle diameter of the graft basis is about 0.4 μm. (for comparison).

Preparation of the mixtures.

The components were mixed as shown in Table 2 and compounded in a conical, double shaft extruder at 230° C. The sample bodies were prepared by injection moulding at 250° C.

The moulding compounds according to the invention of examples 1 to 4 do not delaminate under mechanical stress. The broken standard test rods show a constriction of the body at the break. The corresponding moulded bodies of the comparison examples showed distinct delamination and scaling after breakage.

The thermostability was assessed by high temperature spraying, the melt being maintained at 280° C. for 10 minutes before spraying. The moulding compounds of comparison examples 5 to 7 show a distinctly more pronounced discolouration than the moulding compounds of examples 1 to 4 according to the invention.

To assess the tendency of the moulding compounds to undergo cross linking, the compounds were heated to 280° C. and maintained at this temperature. The fluidity of the compounds was then determined by the MFI method after 5, 10, 15 and 20 minutes.

The moulding compounds according to the invention of examples 1 to 4 show no increase in melt viscosity whereas the moulding compounds of comparison examples 5 to 7 do show an increase in the melt viscosity. Table 2 shows the half life values $t_{\frac{1}{2}}$ taken for the fluidity of the melt to be reduced to half the initial value.

TABLE 2

| Composition | 20° C. $a_k$ KJ/m² | −40° C. $a_k$ KJ/m² | Vicat B °C. | MFI 260° C. g/10 min | discolouration 280° C./10 | IMI $t_{\frac{1}{2}}$ 280° C. |
|---|---|---|---|---|---|---|
| 1  35 parts A1 45 parts B 20 parts C1 | 55 | 35 | 122 | 6.5 | slight | — |
| 2  35 parts A1 45 parts B 20 parts C2 | 40 | 25 | 121 | 7.3 | — | — |
| 3  30 parts A2 50 parts B 20 parts C1 | 53 | 27 | 124 | 8.0 | slight | — |
| 4  35 parts A3 45 parts B 20 parts C1 | 50 | 25 | 126 | 6.8 | slight | — |
| Comparison experiments | | | | | | |
| 5  30 parts V1 45 parts B 20 parts C3 | 35 | 18 | 121 | 4.9 | severe | 20 min |
| 6  35 parts V2 45 parts B 20 parts C3 | 30 | 15 | 122 | 5.1 | severe | 24 min |
| 7  35 parts V1 45 parts B 20 parts C1 | 30 | 17 | 123 | 4.7 | marked | 27 min | a Index K notched impact strength according to DIN 53 453
Vic. B dimensional stability under heat according to Vicat B in °C. according to DIN 53 460
MFI melt flow index according to DIN 53 735 at 260° C.

We claim:

1. A thermoplastic moulding composition consisting essentially of a blend of
(A) 12-78 parts by weight, based on the weight of the moulding composition, of a randomly structured copolymer of
   ($a_1$) 24 to 87 parts by weight, based on the weight of the copolymer, of styrene, p-methyl styrene or mixtures thereof
   ($a_2$) 8 to 30 parts by weight, based on the weight of the copolymer, of maleic acid anhydride and
   ($a_3$) 5 to 68 parts by weight, based on the weight of the copolymer, of methyl methacrylate,
(B) 12-78 parts by weight, based on the weight of the moulding composition, of a thermoplastic aromatic polycarbonate and
(C) 10-40 parts by weight, based on the weight of the moulding composition, of a graft polymer of 20 to 80 parts, by weight of the graft polymer, of methacrylate on 80 to 20 parts, by weight of the graft polymer, of a rubber having a glass transition temperature below −20° C.

* * * * *